US012669593B2

(12) United States Patent
Hsieh et al.

(10) Patent No.: US 12,669,593 B2
(45) Date of Patent: Jun. 30, 2026

(54) POINT CLOUD POSITIONING ERROR DETECTION METHOD AND SYSTEM

(71) Applicant: INDUSTRIAL TECHNOLOGY RESEARCH INSTITUTE, Hsinchu (TW)

(72) Inventors: Wei-Yuan Hsieh, Taipei City (TW); Ming-Xuan Wu, New Taipei City (TW); Chia-Jui Hu, New Taipei City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 557 days.

(21) Appl. No.: 18/089,279

(22) Filed: Dec. 27, 2022

(65) Prior Publication Data

US 2024/0094362 A1 Mar. 21, 2024

Related U.S. Application Data

(60) Provisional application No. 63/408,689, filed on Sep. 21, 2022.

(30) Foreign Application Priority Data

Nov. 11, 2022 (TW) .................................. 111143155

(51) Int. Cl.
G01S 7/497 (2006.01)
G01S 17/89 (2020.01)

(52) U.S. Cl.
CPC .............. G01S 7/497 (2013.01); G01S 17/89 (2013.01)

(58) Field of Classification Search
CPC ........... G01S 17/00; G01S 7/497; G01S 17/89
See application file for complete search history.

(56) References Cited

U.S. PATENT DOCUMENTS 10,082,797 B2 9/2018 Micks et al.
10,565,457 B2 2/2020 Luo et al.
(Continued)

FOREIGN PATENT DOCUMENTS

CN 104700451 B 6/2015
CN 106546977 A 3/2017
(Continued)

OTHER PUBLICATIONS

"Towards a Point Cloud Structural Similarity Metric," 2020 IEEE International Conference on Multimedia & Expo Workshops (ICMEW), London, UK, 2020 (Year: 2020).*
(Continued)

*Primary Examiner* — Andrew Schechter
*Assistant Examiner* — Ethan Wesley Edwards
(74) *Attorney, Agent, or Firm* — Maschoff Brennan

(57) ABSTRACT

A point cloud positioning error detection method, performed by a processing device, includes: obtaining a plurality of pieces of first point data and a target point cloud map, wherein the target point cloud map includes a plurality of pieces of target point data, registering the first point data and the target point data to obtain a plurality of pieces of second point data, selecting a plurality of pieces of third point data from the second point data according to a first default distance, calculating a plurality of matching scores of the third point data relative to the target point data, obtaining a plurality of step vectors corresponding to the third point data, respectively, when said registering converges, and obtaining a plurality of effective values according to directions of the step vectors, and outputting a localization fault detection result based on an intersection of the matching scores and the effective values.

8 Claims, 9 Drawing Sheets

(56) References Cited

U.S. PATENT DOCUMENTS

| | | | |
|---|---|---|---|
| 10,628,949 B2 | 4/2020 | Aflalo et al. | |
| 2016/0065534 A1* | 3/2016 | Liu ..................... | G06F 16/951 |
| | | | 707/728 |
| 2017/0046840 A1 | 2/2017 | Chen et al. | |
| 2020/0234491 A1* | 7/2020 | Pöyhtäri ............... | G06T 17/00 |
| 2021/0025998 A1 | 1/2021 | Huber | |
| 2023/0052072 A1 | 2/2023 | Jia et al. | |

FOREIGN PATENT DOCUMENTS

| | | |
|---|---|---|
| CN | 105976312 B | 3/2019 |
| CN | 109270545 B | 8/2020 |
| CN | 114387319 A | 4/2022 |
| CN | 114565726 A | 5/2022 |
| TW | I617995 B | 5/2018 |

OTHER PUBLICATIONS

Biber, Peter et al. "The Normal Distributions Transform: A New Approach to Laser Scan Matching." IEEE International Conference on Intelligent Robots and Systems. 3. 2743-2748 vol. 3. 10.1109/IROS.2003.1249285. (Year: 2003).*

TW Office Action dated Mar. 21, 2024 as received in Application No. 111143155.

Salti et al. "A Performance Evaluation of 3D Keypoint Detectors" 2011 International Conference on 3D Imaging, Modeling, Processing, Visualization and Transmission, May 2011.

Deng et al. "A Robust Loss for Point Cloud Registration" Aug. 2021 IEEE/CVF International Conference on Computer Vision (ICCV) pp. 6118-6127.

Yang et al. "An analytical approach to evaluate point cloud registration error utilizing targets" ISPRS Journal of Photogrammetry and Remote Sensing vol. 143, Sep. 2018, pp. 48-56.

Lachhani et al. "Error Metric for Indoor 3D Point Cloud Registration" Conference: Irish Machine Vision and Image Processing Conferencevol. 2014 Aug. 2014.

Bueno et al. "Evaluation of point cloud registration using Monte Carlo method" Measurement vol. 92, Oct. 2016, pp. 264-270.

Shen et al. "Reliable Inlier Evaluation for Unsupervised Point Cloud Registration" The Thirty-Sixth AAAI Conference on Artificial Intelligence (AAAI-22) Feb. 2022.

* cited by examiner

1

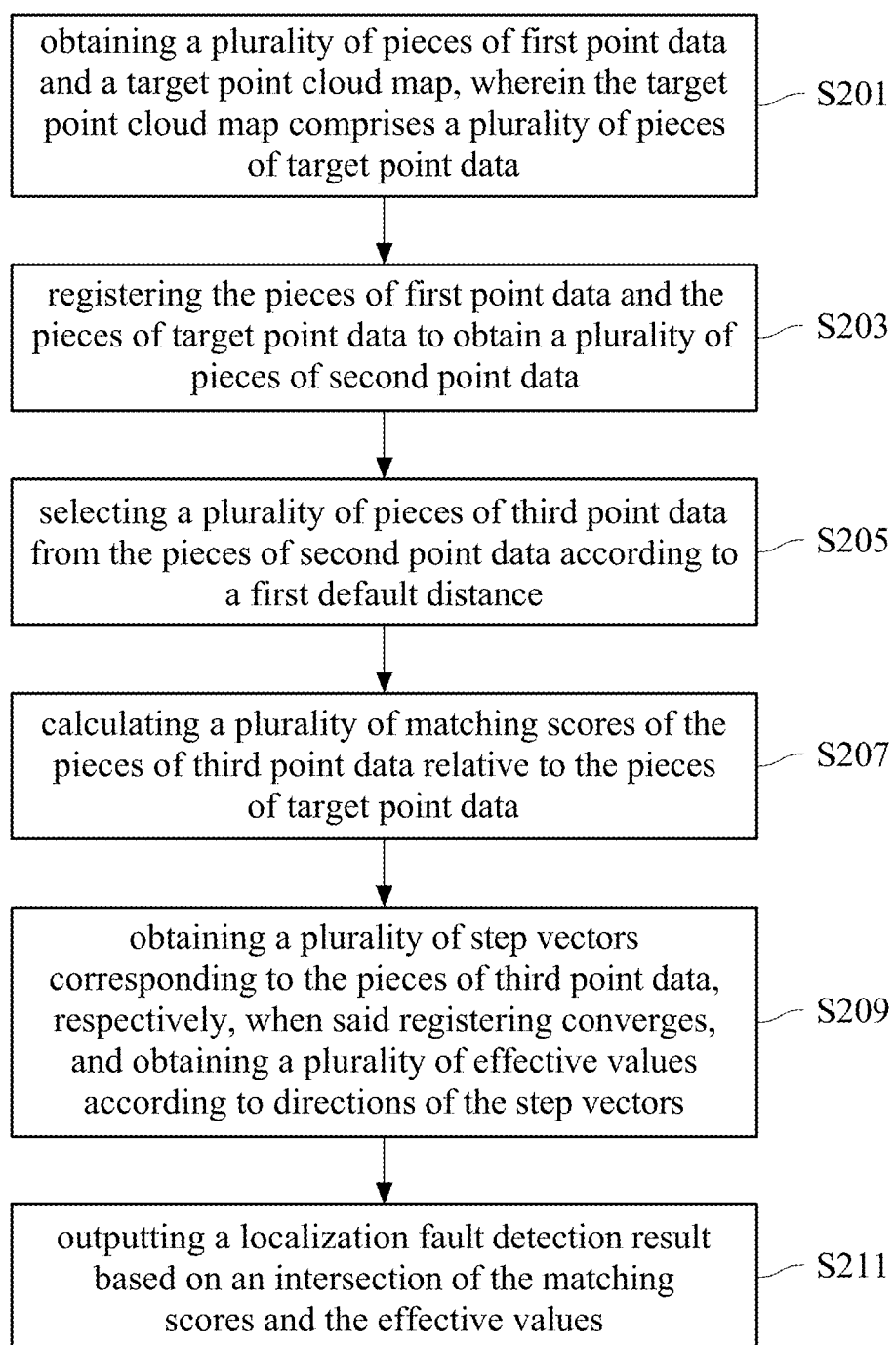

obtaining a plurality of pieces of first point data and a target point cloud map, wherein the target point cloud map comprises a plurality of pieces of target point data     S201 registering the pieces of first point data and the pieces of target point data to obtain a plurality of pieces of second point data     S203 selecting a plurality of pieces of third point data from the pieces of second point data according to a first default distance     S205 calculating a plurality of matching scores of the pieces of third point data relative to the pieces of target point data     S207 obtaining a plurality of step vectors corresponding to the pieces of third point data, respectively, when said registering converges, and obtaining a plurality of effective values according to directions of the step vectors     S209 outputting a localization fault detection result based on an intersection of the matching scores and the effective values     S211

FIG. 2

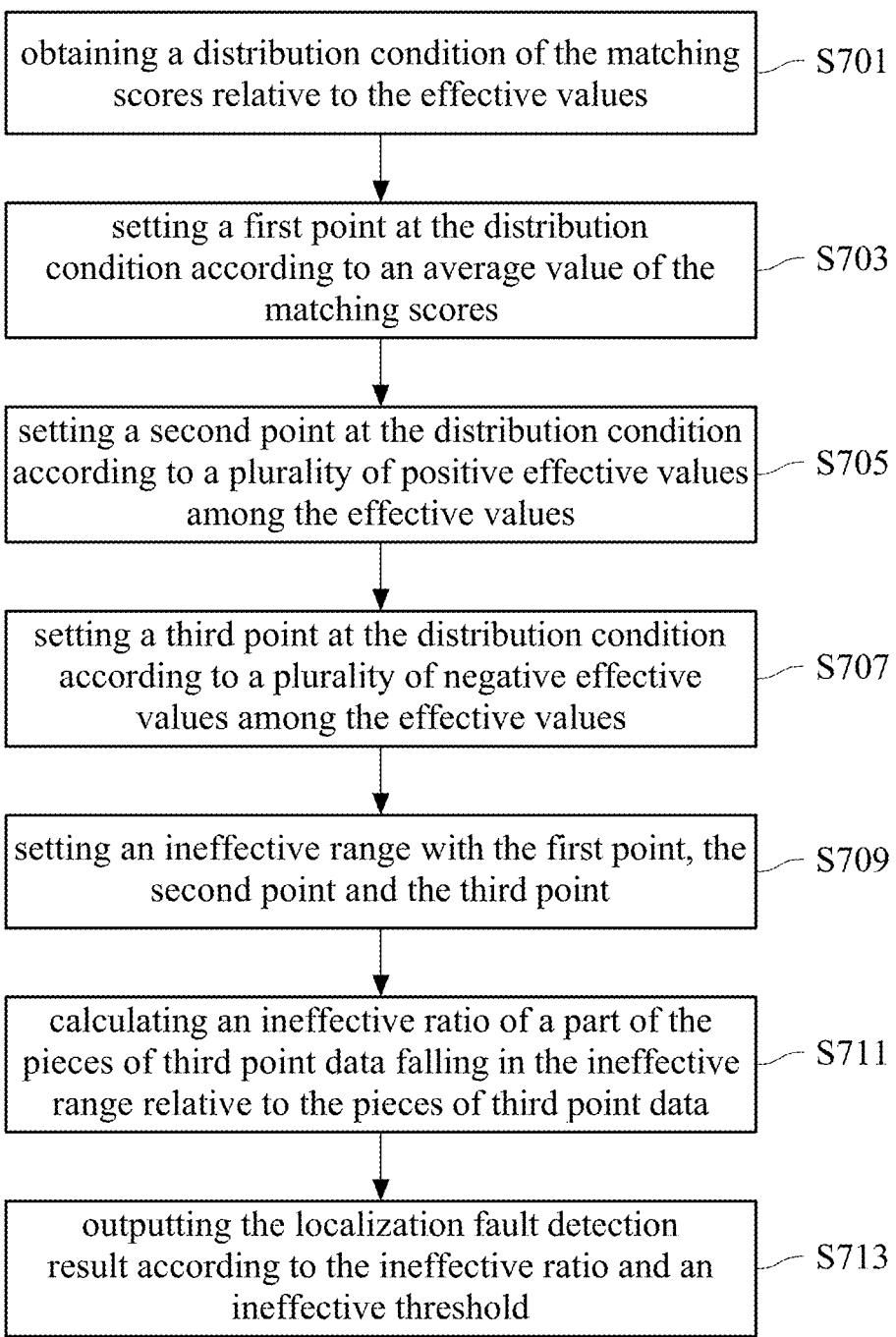

obtaining a distribution condition of the matching scores relative to the effective values — S701 setting a first point at the distribution condition according to an average value of the matching scores — S703 setting a second point at the distribution condition according to a plurality of positive effective values among the effective values — S705 setting a third point at the distribution condition according to a plurality of negative effective values among the effective values — S707 setting an ineffective range with the first point, the second point and the third point — S709 calculating an ineffective ratio of a part of the pieces of third point data falling in the ineffective range relative to the pieces of third point data — S711 outputting the localization fault detection result according to the ineffective ratio and an ineffective threshold — S713

FIG. 7

POINT CLOUD POSITIONING ERROR DETECTION METHOD AND SYSTEM

CROSS-REFERENCE TO RELATED APPLICATIONS

This non-provisional application claims priority under 35 U.S.C. § 119(a) on Patent Application No(s). 63/408,689 filed in US on Sep. 21, 2022 and Patent Application No(s). 111143155 filed in Republic of China (ROC) on Nov. 11, 2022, the entire contents of which are hereby incorporated by reference.

BACKGROUND

1. Technical Field

This disclosure relates to a point cloud positioning error detection method and system.

2. Related Art

At present, most of the positioning requirements of self-driving cars or intelligent driving assistance systems are based on LiDAR sensing data, and are combined with point cloud overlay to calculate the transfer matrix. The point cloud overlay is carried out through iteration. During the iteration process, the local fractional gradient is continuously calculated and the transfer estimation value is updated to quickly achieve convergence. Due to the advantages in efficiency, the technology of using point cloud overlay for positioning is widely used in vehicle positioning systems. However, the reliance on local gradients also makes it easy to compute erroneous results when the initial estimate is poor.

SUMMARY

According to one or more embodiment of this disclosure, a point cloud positioning error detection method, performed by a processing device, includes: obtaining a plurality of pieces of first point data and a target point cloud map, wherein the target point cloud map includes a plurality of pieces of target point data; registering the pieces of first point data and the pieces of target point data to obtain a plurality of pieces of second point data; selecting a plurality of pieces of third point data from the pieces of second point data according to a first default distance; calculating a plurality of matching scores of the pieces of third point data relative to the pieces of target point data; obtaining a plurality of step vectors corresponding to the pieces of third point data, respectively, when said registering converges, and obtaining a plurality of effective values according to directions of the step vectors; and outputting a localization fault detection result based on an intersection of the matching scores and the effective values.

According to one or more embodiment of this disclosure, a point cloud positioning error detection system includes a point cloud generator and a processing device. The point cloud generator is configured to generate a plurality of pieces of first point data. The processing device is connected to the point cloud generator, and configured to perform: registering the pieces of first point data and a plurality of pieces of target point data of a target point cloud map to obtain a plurality of pieces of second point data; selecting a plurality of pieces of third point data from the pieces of second point data according to a first default distance;

calculating a plurality of matching scores of the pieces of third point data relative to the pieces of target point data; obtaining a plurality of step vectors corresponding to the pieces of third point data, respectively, when said registering converges, and obtaining a plurality of effective values according to directions of the step vectors; and outputting a localization fault detection result based on an intersection of the matching scores and the effective values.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 2 is a flowchart of a point cloud positioning error detection method according to an embodiment of the present disclosure;

FIG. 7 is a detailed flowchart of step S211 of FIG. 2 according to an embodiment of the present disclosure;

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
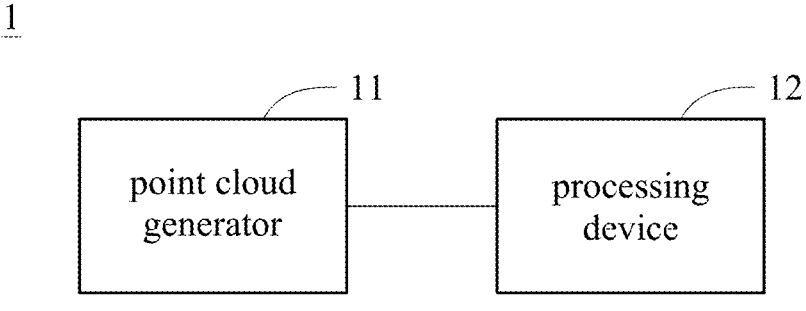
FIG. 1 is a block diagram of a point cloud positioning error detection system according to an embodiment of the present disclosure.

Please refer to FIG. 1, wherein FIG. 1 is a block diagram of a point cloud positioning error detection system according to an embodiment of the present disclosure. As shown in FIG. 1, the point cloud positioning error detection system 1 includes a point cloud generator 11 and a processing device 12. The point cloud generator 11 may be electrically connected to the processing device 12, or the point cloud generator 11 may be in communication connection with the processing device 12. The point cloud positioning error detection system 1 may be disposed on a mobile vehicle, such as cars, robots, air drones, boats and airplanes, etc., for performing error detection on the registered point cloud.

The point cloud generator 11 may be a 3D laser scanner, such as a light detection and ranging (LiDAR) sensor. The point cloud generator 11 is configured to sense the surrounding of the mobile vehicle to generate corresponding point data, wherein one piece of point data represents one point cloud.

The processing device 12 may be a central processing unit (CPU), a programmable logic device or an application specific integrated circuit etc., and may be installed in an automotive computer or disposed separately from the automotive computer. The processing device 12 is configured to register point data and perform error detection on the registration result.

To further elaborate the operation of the point cloud positioning error detection system 1, please refer to FIG. 1 and FIG. 2, wherein FIG. 2 is a flowchart of a point cloud positioning error detection method according to an embodiment of the present disclosure. The point cloud positioning error detection method according to an embodiment of the present disclosure is performed by the processing device 12, and the method includes: step S201: obtaining a plurality of pieces of first point data and a target point cloud map, wherein the target point cloud map comprises a plurality of pieces of target point data; step S203: registering the pieces of first point data and the pieces of target point data to obtain a plurality of pieces of second point data; step S205: selecting a plurality of pieces of third point data from the pieces of second point data according to a first default distance; step S207: calculating a plurality of matching scores of the pieces of third point data relative to the pieces of target point data; step S209: obtaining a plurality of step vectors corresponding to the pieces of third point data, respectively, when said registering converges, and obtaining a plurality of effective values according to directions of the step vectors; and step S211: outputting a localization fault detection result based on an intersection of the matching scores and the effective values.

In step S201, the processing device 12 obtains the pieces of first point data from the point cloud generator 11 and the target point cloud map. The pieces of first point data may be point data (currently) generated by the point cloud generator 11 when sensing the surroundings. The processing device 12 may pre-store the target point cloud map, or the target point cloud map may be pre-stored in a memory accessible to the processing device 12. The target point cloud map is a map built in advance, and the target point cloud map includes the pieces of target point data, wherein the target point data may be used as a standard for registration of the first point data.

In step S203, the processing device 12 performs registration on the pieces of first point data and the pieces of target point data to overlay the pieces of first point data onto the target point cloud map. In step S203, the processing device 12 uses the pieces of first point data registered with the target point cloud map as the pieces of second point data. In other words, the pieces of second point data are data having the corresponding pieces of target point data, wherein a data amount of the pieces of second point data is not greater than a data amount of the pieces of first point data.

In step S205, among all pieces of second point data, the processing device 12 uses the second point data with a distance from the target point data falling in the first default distance as the third point data. In other words, comparing to the second point data not used as the third point data, the third point data is closer to the target point data. The first default distance may be set according to the application of the point cloud positioning error detection system 1. For example, if the point cloud positioning error detection system 1 is applied to an indoor scenario, the first default distance may be 0.1 meter to 1 meter; and if the point cloud positioning error detection system 1 is applied to an outdoor scenario, the first default distance may be 1 meter to 5 meters, but the present disclosure is not limited thereto.

In step S207, the processing device 12 calculates the matching score of each one of the pieces of third point data relative to the corresponding piece of target point data. For each one of the pieces of third point data, the matching score may indicate a distance between the third point data and the surrounding target point data. If the matching score is higher, it means that the distance between the third point data and the target point data is shorter.

In step S209, the processing device 12 obtains the step vector when said registration of each one of the pieces of third point data converges, and obtains the effective value of the third point data according to the step vector. Furthermore, the processing device 12 may perform a plurality of iterations during registration, and obtain the step vector of each point when determining the registration converges (i.e. the step vector of the last (final) iteration). After obtaining the step vector, if the step vector is in a default direction, the processing device 12 designates the third point data with higher effective value; on the contrary, if the step vector is in an opposite direction of the default direction, the processing device 12 designates the third point data with lower effective value.

Specifically, the step vector may indicate a vector from a position before convergence to a position of convergence of the third point data. Take one piece of third point data as an example, assuming that the third point data moves from a first position to a second position during the final two registrations, the processing device 12 may use a vector of the second position relative to the first position as the step vector of the third point data.

In step S211, the processing device 12 outputs the localization fault detection result based on the intersection of the matching score and the effective value. Furthermore, among all pieces of third point data, the processing device 12 determines one or more pieces of third point data with the matching score and the effective value fall within default ranges, and outputs the localization fault detection result according to said one or more pieces of third point data, wherein the matching scores and the effective values falling within default range are low matching scores and effective values comparing to the matching scores and the effective values falling within default range. In other words, the localization fault detection result may indicate the number of the pieces of third point data falling in the default range, the localization fault detection result may also indicate the third point data that may be incorrectly registered.

Take an application for car as an example, the localization fault detection result may be outputted to an automobile computer, for the automobile computer to use more accurate positioning results. In addition, the localization fault detection result may be used to determine whether the car's components are functioning properly. For example, when the localization fault detection result indicates that a percentage of the pieces of third point data with error registration result is higher than a default percentage, the automobile computer and/or the processing device 12 may further determine whether the point cloud generator 11 is malfunctioning. The present disclosure does not limit the application of the localization fault detection result.

Based on the above embodiment, the result of point cloud registration may be effectively examined to avoid miscalculations when point cloud registration (overlay) fails, and thereby improving positioning accuracy. In addition, based on the above embodiment, the quality of point cloud positioning results may be examined based on the point clouds used to generate the positioning results, without comparing with manually labeled point data or other point data generated by other point cloud generators.

Figure 3:
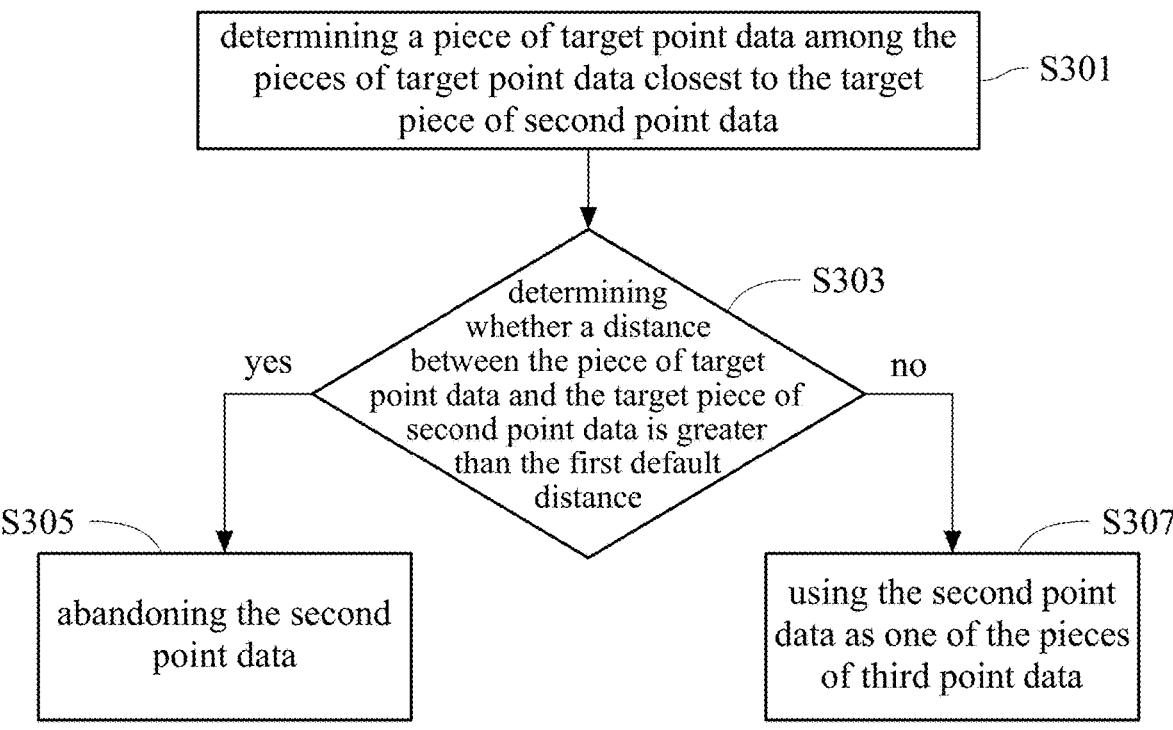
FIG. 3 is a detailed flowchart of step S205 of FIG. 2 according to an embodiment of the present disclosure.

Please refer to FIG. 1 and FIG. 3, wherein FIG. 3 is a detailed flowchart of step S205 of FIG. 2 according to an embodiment of the present disclosure. As shown in FIG. 3, step S205 of FIG. 2 may include: for each of the pieces of second point data as a target piece of second point data, performing: step S301: determining a piece of target point data among the pieces of target point data closest to the target piece of second point data; step S303: determining whether a distance between the piece of target point data and the target piece of second point data is greater than the first default distance; if the determination result of step S303 is "yes", performing step S305: abandoning the target piece of second point data; and if the determination result of step S303 is "no", performing step S307: using the target piece of second point data as one of the pieces of third point data.

In step S301, the processing device 12 selects one of the pieces of target point data, among all pieces of target point data, that is the closest to the second point data. In step S303, the processing device 12 determines whether the distance between the selected target point data and the second point data is greater than the first default distance.

If the processing device 12 determines that the distance between the selected target point data and the second point data is greater than the first default distance, the processing device 12 may regard this piece of second point data as not matching with the piece of target point data. Therefore, in step S305, the processing device 12 may abandon this piece of second point data. On the contrary, if the processing device 12 determines that the distance between the selected target point data and the second point data is not greater than the first default distance, the processing device 12 may regard this piece of second point data as matching with the piece of target point data. Therefore, in step S307, the processing device 12 may use this piece of second point data as the third point data for subsequent calculation of the matching score.

By partially abandoning the second point data, the deviation of subsequent calculation of the matching score may be avoided.

Figure 4:
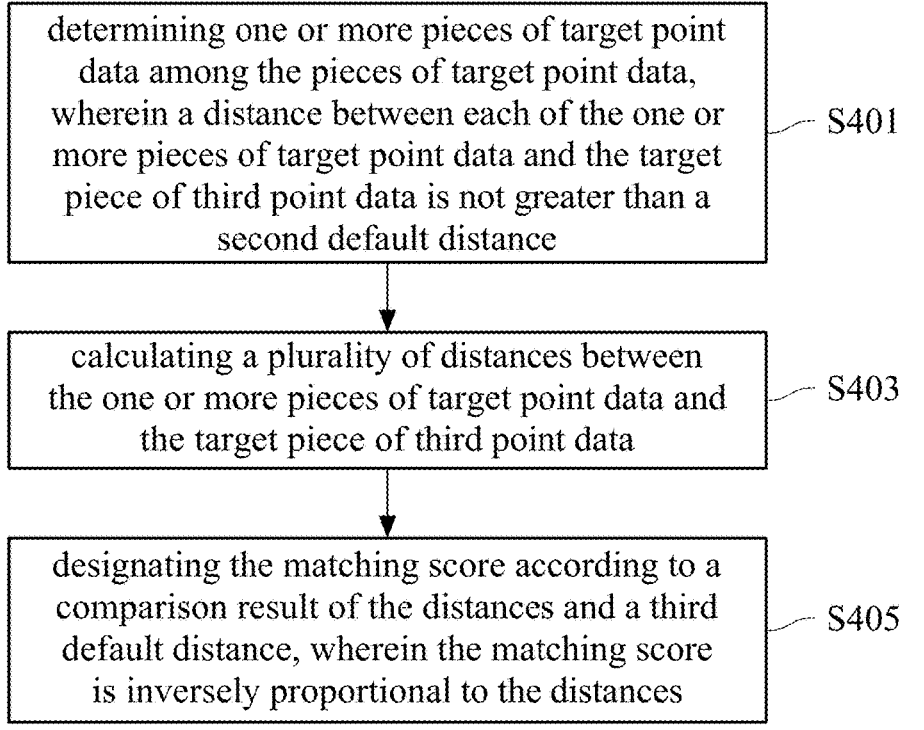
FIG. 4 is a detailed flowchart of step S207 of FIG. 2 according to an embodiment of the present disclosure.

Please refer to FIG. 1 and FIG. 4, wherein FIG. 4 is a detailed flowchart of step S207 of FIG. 2 according to an embodiment of the present disclosure. As shown in FIG. 4, step S207 of FIG. 2 may include: for each of the pieces of third point data as a target piece of third point data, performing: step S401: determining one or more pieces of target point data among the pieces of target point data, wherein a distance between the one or more pieces of target point data and the third point data is not greater than a second default distance; step S403: calculating a plurality of distances between the one or more pieces of target point data and the third point data; and step S405: designating the matching score according to a comparison result of the distances and a third default distance, wherein the matching score is inversely proportional to the distances.

In step S401, among all pieces of third point data, the processing device 12 selects one or more pieces of target point data that is(are) the closest to the third point data, and a distance between every selected piece of target point data and the third point data is not greater than the second default distance. The second default distance may be the same as the first default distance, the second default distance may also be set to be greater than or smaller than the first default distance according to user requirements.

In step S403, for every piece of the target point data selected in step S401, the processing device 12 calculates the distance between the selected piece of target point data and the third point data. In step S405, the processing device 12 determines whether the calculated distance is greater than the third default distance to obtain the comparison result. If the comparison result indicates that the calculated distance is greater than the third default distance, the processing device 12 designates a lower matching score; on the contrary, if the comparison result indicates that the calculated distance is not greater than the third default distance, the processing device 12 designates a higher matching score.

In other words, if the distance is greater than the third default distance, it means that the matching between the target point data and the third point data may not be ideal; and if the distance is not greater than the third default distance, it means that the matching between the target point data and the third point data is good.

The third default distance may be the same as the first default distance and the second default distance, the third default distance may also be set to be greater than or smaller than the first default distance/the second default distance according to different requirements.

In addition, for step S403 and step S405, the processing device 12 may calculate the matching score using the following equation (1):

$$\text{matching score} = \sum_i \exp\left(\frac{-(x_i' - q_i)^T \sum_i^{-1} (x_i' - q_i)}{2}\right) \qquad \text{equation (1)}$$

wherein, $x_i'$ is the i-th point of the third point data; $q_i$ is the mean vector of a normal distribution in the target point cloud map corresponding to the position of the third point data $x_i'$. $\Sigma_i$ is the covariance matrix of the normal distribution. The superscript "T" denotes a matrix transpose operation. The superscript "−1" denotes a matrix inverse operation. The summation $\Sigma_i$ is performed over the index i representing each individual point within the set of the third point data.

Figure 5:
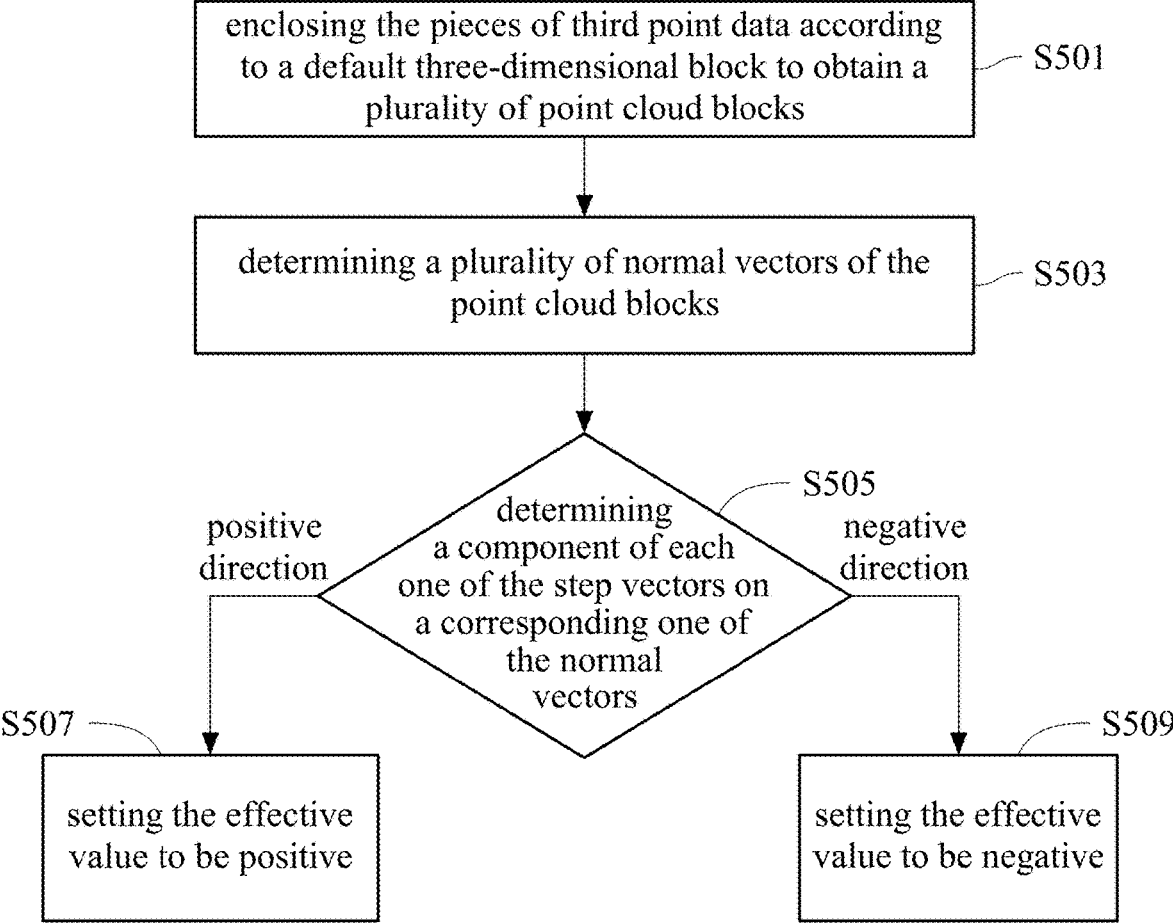
FIG. 5 is a detailed flowchart of step S209 of FIG. 2 according to an embodiment of the present disclosure.
Figure 6:
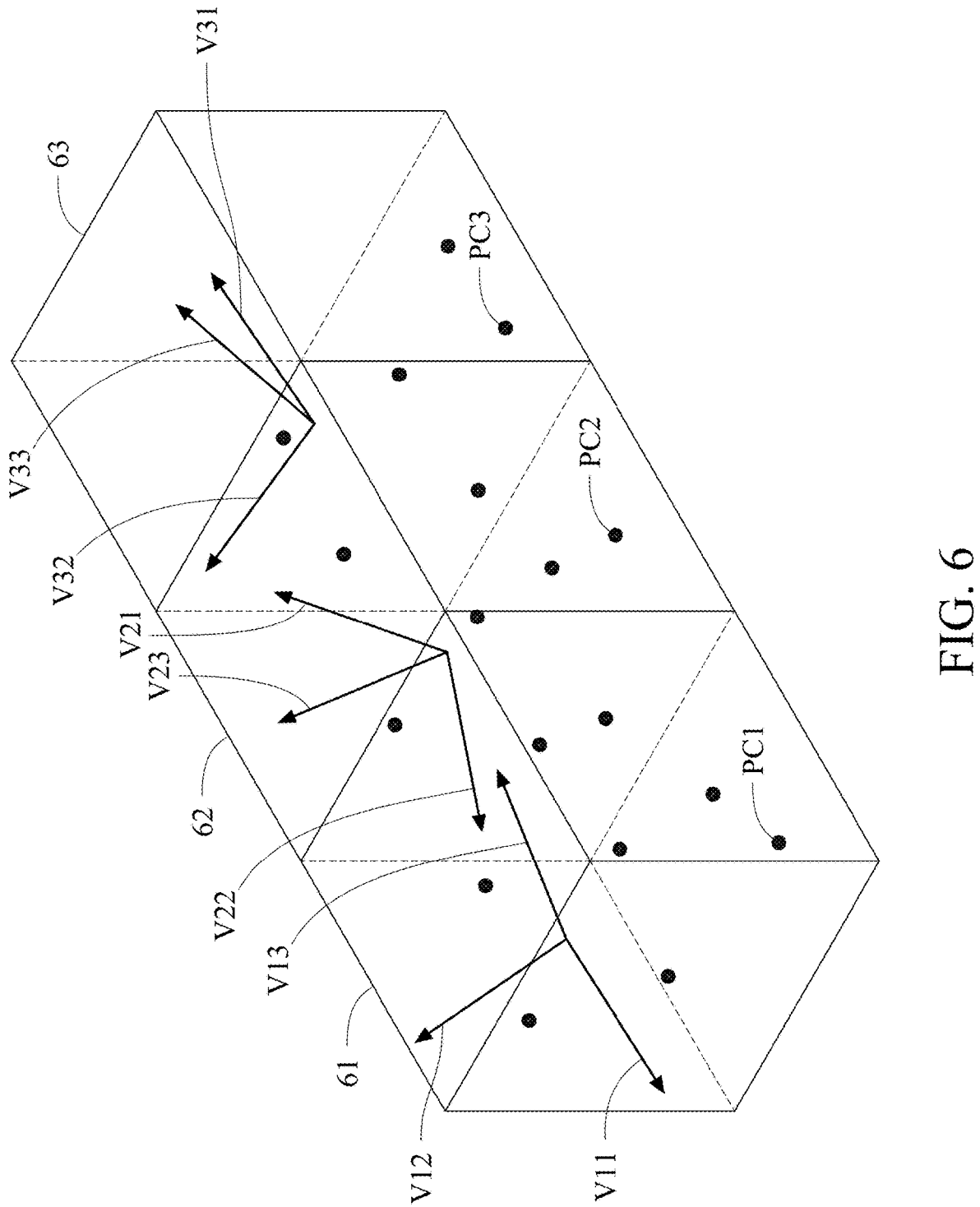
FIG. 6 is a schematic diagram of obtaining effective values according to directions of step vectors.

Please refer to FIG. 1, FIG. 5 and FIG. 6, wherein FIG. 5 is a detailed flowchart of step S209 of FIG. 2 according to an embodiment of the present disclosure, and FIG. 6 is a schematic diagram of obtaining effective values according to directions of step vectors. As shown in FIG. 5, step S209 of FIG. 2 may include: step S501: enclosing the pieces of third point data according to a default three-dimensional block to obtain a plurality of point cloud blocks; step S503: determining a plurality of normal vectors of the point cloud blocks; step S505: determining a component of each one of the step vectors on a corresponding one of the normal vectors; if the determination result of step S505 is that the component is in a positive direction, performing step S507: setting the effective value to be positive; and if the determination result of step S505 is that the component is in a negative direction, performing step S509: setting the effective value to be negative.

In step S501, the processing device 12 uses a plurality of default 3D blocks to enclose at least a part of the third point data to obtain a plurality of point cloud blocks 61-63, wherein the size and shape of the default 3D blocks may be the same with each other. For example, the default 3D block may be a cube with side lengths of 1 or 2 meters, the present disclosure does not limit the actual size and shape of the default 3D block. Accordingly, the first point cloud block 61 may include pieces of third point data PC1, the second point cloud block 62 may include pieces of third point data PC2, and the third point cloud block 63 may include pieces of third point data PC3.

In step S503, the processing device 12 may perform normal distribution calculation on the third point data PC1-PC3 of each one of the first point cloud block 61 to the third point cloud block 63, to generate the corresponding normal vectors. As shown in FIG. 6, the third point data PC1 of the first point cloud block 61 may have a first normal vector V11, the third point data PC2 of the second point cloud block 62 may have a second normal vector V21, and the third point data PC3 of the third point cloud block 63 may have a third normal vector V31. In addition, as shown in FIG. 6, the third point data PC1-PC3 may further have corresponding principal vectors V12, V22 and V32 and corresponding sub-vectors V13, V23 and V33. Take the first point cloud block 61 for example, among the vectors generated by performing the normal distribution calculation on the third point data PC1, the vector with the longest length may be regarded as the principal vector V12, the vector with the second longest length may be regarded as the sub-vector V13, and the vector with the shortest length may be regarded as the normal vector V11.

In step S505, the processing device 12 may determine a direction of a component of the step vector on the corresponding normal vector. Take the first point cloud block 61 for example, the processing device 12 determines whether the component of the step vector of one piece of the third point data PC1 on the first normal vector V11 is in a positive direction or a negative direction. Further, said positive direction means a direction opposite to the direction of the normal vector; and said negative direction means a direction that is the same as the direction of the normal vector. If a length of a projection of the step vector onto the normal vector is zero, the effective value may be set as zero. Therefore, in step S507 or step S509, the processing device 12 may set a value of the component to be a positive (plus sign) value or a negative (minus sign) value, and use the set value as the effective value. A range of the positive value may be greater than 0 and equal to or smaller than 1, a range of the negative value may be smaller than 0 and greater than or equal to −1.

Figure 8:
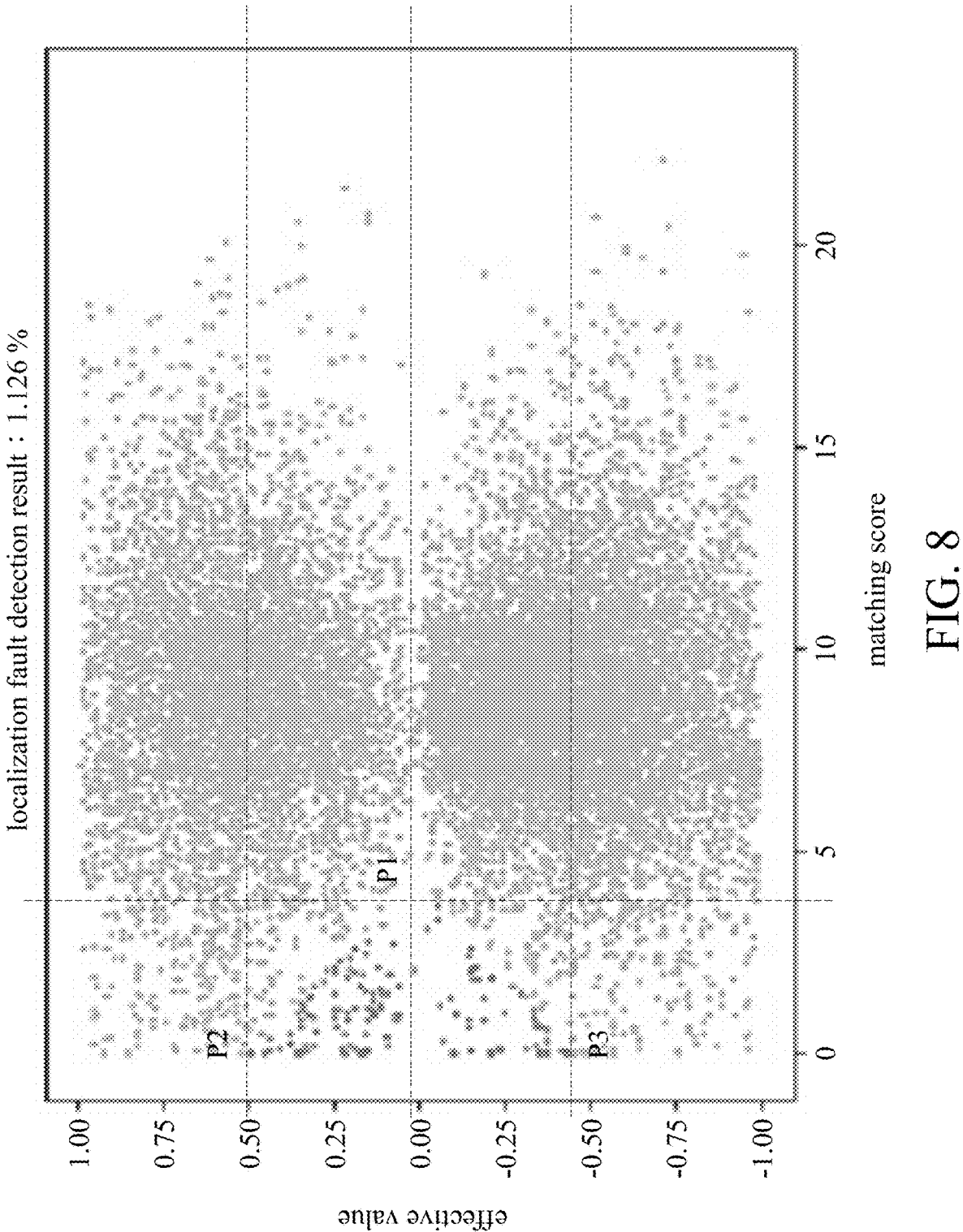
FIG. 8 is a schematic diagram of a distribution condition.

Please refer to FIG. 1, FIG. 7 and FIG. 8, wherein FIG. 7 is a detailed flowchart of step S211 of FIG. 2 according to an embodiment of the present disclosure, FIG. 8 is a schematic diagram of a distribution condition. As shown in FIG. 7, S211 of FIG. 2 may include: step S701: obtaining a distribution condition of the matching scores relative to the effective values; step S703: setting a first point at the distribution condition according to an average value of the matching scores; step S705: setting a second point at the distribution condition according to a plurality of positive effective values among the effective values; step S707: setting a third point at the distribution condition according to a plurality of negative effective values among the effective values; step S709: setting an ineffective range with the first point, the second point and the third point; step S711: calculating an ineffective ratio of a part of the pieces of third point data falling in the ineffective range relative to the pieces of third point data; and step S713: outputting the localization fault detection result according to the ineffective ratio and an ineffective threshold.

It should be noted that, the sequence of performing step S703, step S705 and step S707 is not limited to the sequence shown in FIG. 7, and step S703, step S705 and step S707 may also be simultaneously performed. In addition, the dotted lines shown in FIG. 8 are illustrated for better understanding, and in practice, the dotted lines may not be required to be shown in the distribution condition as FIG. 8.

In step S701, the processing device 12 uses the matching score as a horizontal axis, and uses the effective value as a vertical axis, and thereby obtaining the distribution condition shown in FIG. 8, wherein each point shown in FIG. 8 represents one piece of third point data. In other words, the distribution condition is used to present the distribution of the effective value and the matching scores of all third point data.

In step S703, as the vertical dotted line shown in FIG. 8, the processing device 12 calculates the average value of the matching scores of all third point data, uses half of the average value (the vertical dotted line) to divide the distribution condition, and uses an intersection of the vertical dotted line and a horizontal dotted line with the effective value approximately being 0 as the first point P1.

In step S705, as the horizontal dotted line of the effective value approximately being 0.5 shown in FIG. 8, among all of the effective values, the processing device 12 uses half of the positive effective values to divide the distribution condition, and uses an intersection of the horizontal dotted line and the vertical axis of the matching score being 0 as the second point P2.

In step S707, as the horizontal dotted line of the effective value approximately being −0.5 shown in FIG. 8, among all of the effective values, the processing device 12 uses half of the negative effective values to divide the distribution condition, and uses an intersection of the horizontal dotted line and the vertical axis of the matching score being 0 as the third point P3.

In step S709, the processing device 12 uses a connection line between the first point P1 and the second point P2, a connection line between the first point P1 and the third point P3, and a connection line between the second point P2 and the third point P3 to enclose the ineffective range (the default range described above).

In step S711, the processing device 12 calculates the number of pieces of third point data falling within the ineffective range, and calculates the number of pieces of all third point data in the distribution condition, and uses a ratio of the number of pieces of third point data falling within the ineffective range relative to the number of pieces of all third point data as the ineffective ratio. In the example of FIG. 8, the ineffective ratio (the localization fault detection result) is 1.126%. It should be noted that, the third point data on the border of the ineffective range may be regarded as falling within the ineffective range or falling outside of the ineffective range, the present disclosure is not limited thereto.

In step S713, the processing device 12 compares the ineffective ratio with the pre-stored ineffective threshold, and outputs the corresponding localization fault detection result. If the ineffective ratio is greater than the ineffective threshold, the localization fault detection result may indicate that too many pieces of third point data have error registration result, meaning this registration is poor. If the ineffective ratio is not greater than the ineffective threshold, the localization fault detection result may indicate that only a small part of third point data has error registration result, meaning this registration is accurate. Accordingly, the subsequent elements, system etc. using the point cloud positioning result may determine to use or discard this point cloud positioning result based on the result of the positioning error detection.

Figures 9A, 9B:
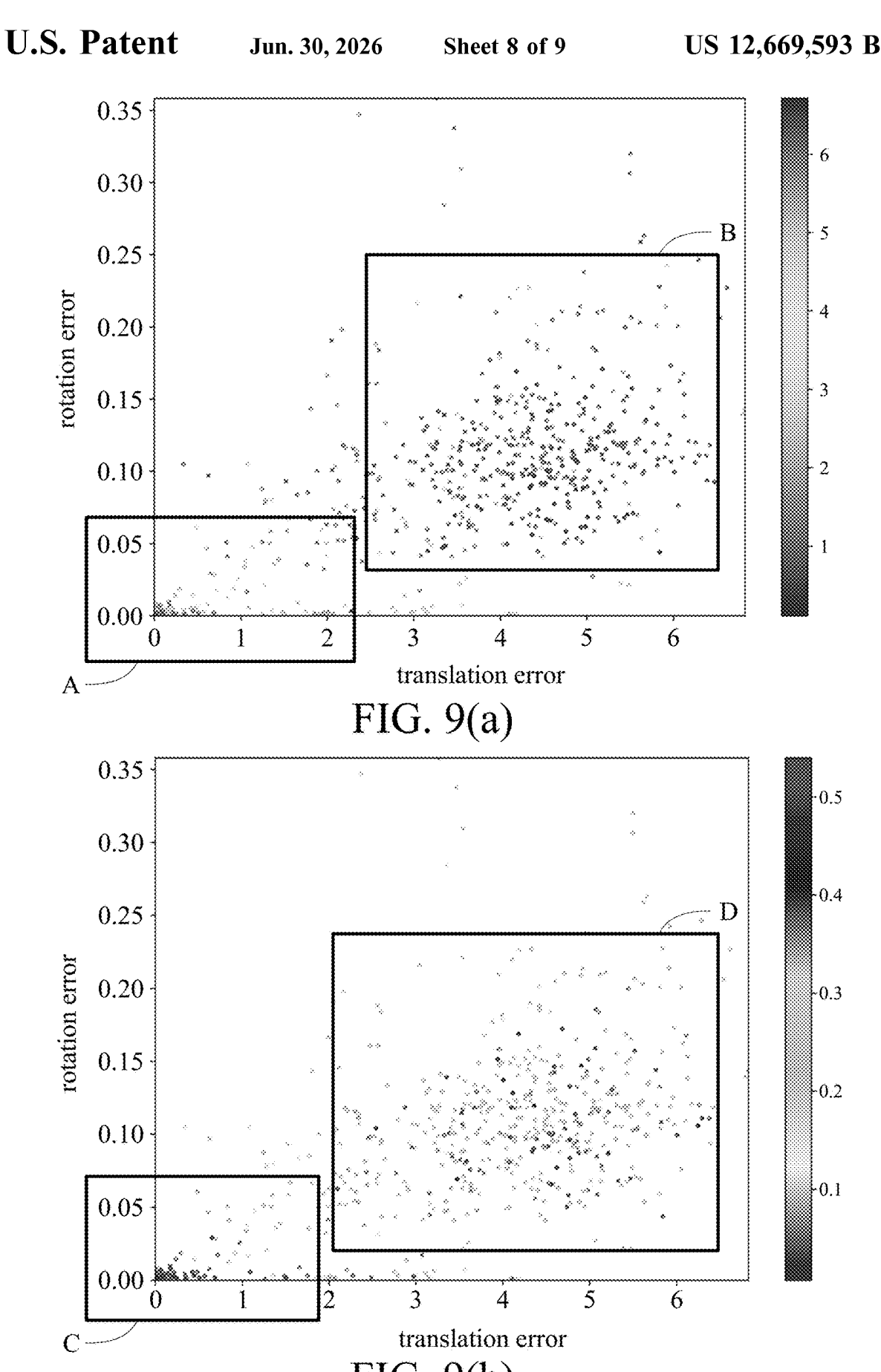
FIG. 9(a) shows the result of performing conventional error detection on the registered point cloud.
FIG. 9(b) shows the result of performing error detection on the registered point cloud according to the point cloud positioning error detection method and system of one or more embodiments of the present disclosure.

Please refer to FIG. 9(a) and FIG. 9(b), wherein FIG. 9(a) shows the result of performing conventional error detection on the registered point cloud; and FIG. 9(b) shows the result of performing error detection on the registered point cloud according to the point cloud positioning error detection method and system of one or more embodiments of the present disclosure. In FIG. 9(a) and FIG. 9(b), each point represents one piece of point data, translation error and rotation error are calculated using Kitti dataset. The bar on the right side of FIG. 9(a) represents the score of point cloud, and the bar on the right side of FIG. 9(b) represents the ineffective ratio.

As shown in FIG. 9(a), point data in block A have smaller translation error and rotation error, and point data in block B have larger translation error and rotation error. However, by referring to the bar on the right side of FIG. 9(a), one can see that, many pieces of point data in block A have higher score, and most point data in block B have lower point cloud score. Therefore, it may be known from FIG. 9(a) that, it is difficult to determine whether the registration result is good or not by using conventional point cloud overlay score.

As shown in FIG. 9(b), point data in the block C have smaller translation error and rotation error, and point data in block D have larger translation error and rotation error. By referring to the bar on the right side of FIG. 9(b), one can see that, point data in the block C all have lower ineffective values, and point data in block D all have higher ineffective values.

Therefore, it may be known from FIG. 9(a) and FIG. 9(b) that, the point cloud positioning error detection method and system according to one or more embodiments of the present disclosure may be used to determine point data with the translation error/rotation error matching the ineffective ratio, thereby obtaining more accurate point cloud localization fault detection result.

Figures 10A, 10B:
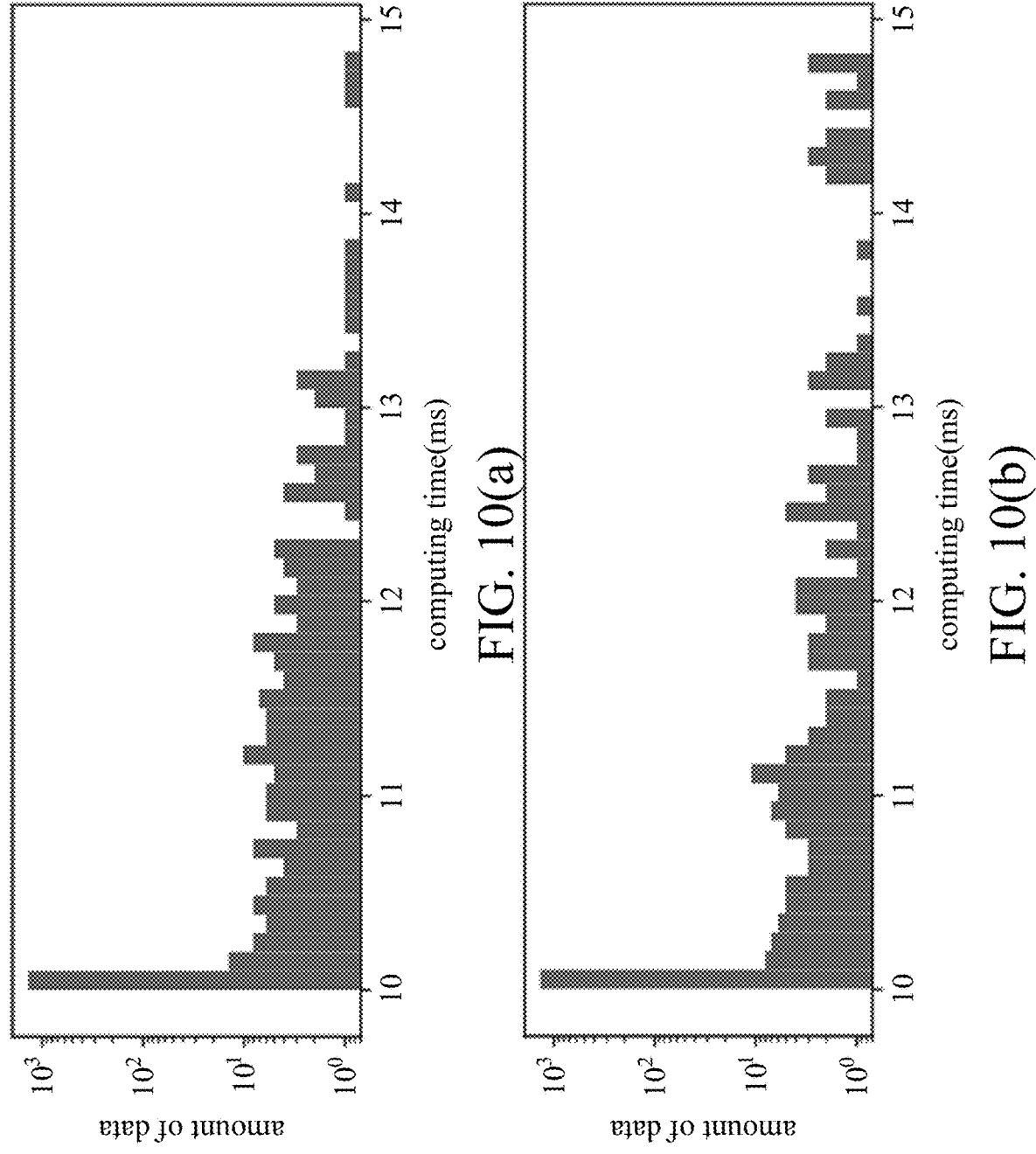
FIG. 10(a) shows the distribution between the amount of data and the computing time for conventional point cloud registration calculation.
FIG. 10(b) shows the distribution between the amount of data and the computing time for registered point cloud according to the point cloud positioning error detection method and system of one or more embodiments of the present disclosure.

Please refer to FIG. 10(a) and FIG. 10(b), wherein FIG. 10(a) shows the distribution between the amount of data and the computing time for conventional point cloud registration calculation; and FIG. 10(b) shows the distribution between the amount of data and the computing time for registered point cloud according to the point cloud positioning error detection method and system of one or more embodiments of the present disclosure.

As shown in FIG. 10(a), when performing registration calculation on point data using conventional technology, calculation durations for most point data are around 10 ms to 12 ms. As shown in FIG. 10(b), when performing registration calculation on point data using the point cloud positioning error detection method and system according to one or more embodiments of the present disclosure, calculation durations for most point data are also around 10 ms to 12 ms. Therefore, based on FIG. 10(a) and FIG. 10(b), it can be known that when using the point cloud positioning error detection method and system of the present disclosure, the computing efficiency of the processing device is not lowered.

In view of the above description, according to the point cloud positioning error detection method and system of one or more embodiments of the present disclosure, the result of point cloud registration may be effectively examined to avoid miscalculations when point cloud registration (overlay) fails, and thereby improving positioning accuracy. When using the point cloud positioning error detection method and system according to one or more embodiments of the present disclosure, the quality of point cloud positioning results may be examined based on the point clouds used to generate the positioning results, without comparing with manually labeled point data or other point data generated by other point cloud generators. In addition, by performing error detection on point cloud positioning, other systems using point cloud positioning result may be ensured to not be paralyzed by error positioning results. In addition, the point cloud positioning error detection method and system according to one or more embodiments of the present disclosure may be used to determine point data with the translation error/rotation error matching the ineffective ratio, thereby obtaining more accurate point cloud localization fault detection result.

What is claimed is:

1. A point cloud positioning error detection method, performed by a processing device, comprising:

obtaining a plurality of pieces of first point data and a target point cloud map, wherein the target point cloud map comprises a plurality of pieces of target point data, wherein the plurality of pieces of first point data are generated by a point cloud generator sensing a surrounding of a vehicle;

registering the pieces of first point data and the pieces of target point data to obtain a plurality of pieces of second point data with a plurality of iterations;

selecting a plurality of pieces of third point data from the pieces of second point data according to a first default distance;

calculating a plurality of matching scores of the pieces of third point data relative to the pieces of target point data;

obtaining a plurality of step vectors corresponding to the pieces of third point data, respectively, when said registering converges, and obtaining a plurality of effective values according to directions of the step vectors; and outputting a localization fault detection result based on an intersection of the matching scores and the effective values, wherein outputting the localization fault detection result based on the intersection of the matching scores and the effective values comprises:

obtaining a distribution of the matching scores relative to the effective values;

setting a first point at the distribution according to an average value of the matching scores;

setting a second point at the distribution according to a plurality of positive effective values among the effective values;

setting a third point at the distribution according to a plurality of negative effective values among the effective values;

setting an ineffective range with the first point, the second point and the third point;

calculating an ineffective ratio of a part of the pieces of third point data falling in the ineffective range relative to the pieces of third point data; and outputting the localization fault detection result according to the ineffective ratio and an ineffective threshold;

wherein the localization fault detection result is outputted to an automobile computer, for the automobile computer to use the localization fault detection result for positioning.

2. The point cloud positioning error detection method according to claim 1, wherein calculating the matching scores of the pieces of third point data relative to the pieces of target point data comprises:

for each of the pieces of third point data as a target piece of third point data, performing:

determining one or more pieces of target point data among the pieces of target point data, wherein a distance between each of the one or more pieces of target point data and the target piece of third point data is not greater than a second default distance;

calculating one or more distances between the one or more pieces of target point data and the target piece of third point data; and designating the matching score according to a comparison result of the distances and a third default distance, wherein the matching score is inversely proportional to the distances.

3. The point cloud positioning error detection method according to claim 1, wherein selecting the pieces of third point data from the pieces of second point data according to the first default distance comprises:

for each of the pieces of second point data as a target piece of second point data, performing:

determining a piece of target point data among the pieces of target point data closest to the target piece of second point data;

determining whether a distance between the piece of target point data and the target piece of second point data is greater than the first default distance;

if the distance is greater than the first default distance, abandoning the target piece of second point data; and if the distance is not greater than the first default distance, using the target piece of second point data as one of the pieces of third point data.

4. The point cloud positioning error detection method according to claim 1, wherein obtaining the effective values according to the directions of the step vectors comprises:

enclosing the pieces of third point data according to a default three-dimensional block to obtain a plurality of point cloud blocks;

determining a plurality of normal vectors of the point cloud blocks;

determining a component of each one of the step vectors on a corresponding one of the normal vectors;

if a direction of the component is in a positive direction, setting the effective value to be positive; and if the direction of the component is in a negative direction, setting the effective value to be negative.

5. A point cloud positioning error detection system, comprising:

a point cloud generator configured to generate a plurality of pieces of first point data by sensing a surrounding of a vehicle; and a processing device connected to the point cloud generator, and configured to perform:

registering the pieces of first point data and a plurality of pieces of target point data of a target point cloud map to obtain a plurality of pieces of second point data with a plurality of iterations;

selecting a plurality of pieces of third point data from the pieces of second point data according to a first default distance;

calculating a plurality of matching scores of the pieces of third point data relative to the pieces of target point data;

obtaining a plurality of step vectors corresponding to the pieces of third point data, respectively, when said registering converges, and obtaining a plurality of effective values according to directions of the step vectors; and outputting a localization fault detection result based on an intersection of the matching scores and the effective values, wherein the processing device performing outputting the localization fault detection result based on the intersection of the matching scores and the effective values comprises:

obtaining a distribution of the matching scores relative to the effective values;

setting a first point at the distribution according to an average value of the matching scores;

setting a second point at the distribution according to a plurality of positive effective values among the effective values;

setting a third point at the distribution according to a plurality of negative effective values among the effective values;

setting an ineffective range with the first point, the second point and the third point;

calculating an ineffective ratio of a part of the pieces of third point data falling in the ineffective range relative to the pieces of third point data; and outputting the localization fault detection result according to the ineffective ratio and an ineffective threshold;

wherein the localization fault detection result is outputted to an automobile computer, for the automobile computer to use the localization fault detection result for positioning.

6. The point cloud positioning error detection system according to claim 5, wherein the processing device performing calculating the matching scores of the pieces of third point data relative to the pieces of target point data comprises:

for each of the pieces of third point data as a target piece of third point data, performing:

determining one or more pieces of target point data among the pieces of target point data, wherein a distance between each of the one or more pieces of target point data and the target piece of third point data is not greater than a second default distance;

calculating one or more distances between the one or more pieces of target point data and the target piece of third point data; and designating the matching score according to a comparison result of the distances and a third default distance, wherein the matching score is inversely proportional to the distances.

7. The point cloud positioning error detection system according to claim 5, wherein the processing device performing selecting the pieces of third point data from the pieces of second point data according to the first default distance comprises:

for each of the pieces of second point data as a target piece of second point data, performing:

determining a piece of target point data among the pieces of target point data closest to the target piece of second point data;

determining whether a distance between the piece of target point data and the target piece of second point data is greater than the first default distance;

if the distance is greater than the first default distance, abandoning the target piece of second point data; and if the distance is not greater than the first default distance, using the target piece of second point data as one of the pieces of third point data.

8. The point cloud positioning error detection system according to claim 5, wherein the processing device performing obtaining the effective values according to the directions of the step vectors comprises:

enclosing the pieces of third point data according to a default three-dimensional block to obtain a plurality of point cloud blocks;

determining a plurality of normal vectors of the point cloud blocks;

determining a component of each one of the step vectors on a corresponding one of the normal vectors;

if a direction of the component is in a positive direction, setting the effective value to be positive; and if the direction of the component is in a negative direction, setting the effective value to be negative.

\* \* \* \* \*